United States Patent [19]

Feldman

[11] Patent Number: 4,598,277
[45] Date of Patent: Jul. 1, 1986

[54] WATER DETECTION SUBASSEMBLIES AND METHOD OF FORMING SAME, FOR USE IN COMPUTER PROCESSING CENTERS

[75] Inventor: Richard B. Feldman, San Mateo, Calif.

[73] Assignee: Chevron Research Company, San Francisco, Calif.

[21] Appl. No.: 635,687

[22] Filed: Jul. 30, 1984

[51] Int. Cl.$^4$ ............................................. G08B 21/00
[52] U.S. Cl. ..................................... 340/604; 174/136; 200/61.05; 340/605; 340/620; 405/37; 405/43
[58] Field of Search ............... 340/602, 603, 604, 605, 340/620; 405/37, 43, 46; 200/61.05; 174/136

[56] References Cited

U.S. PATENT DOCUMENTS

| | | | |
|---|---|---|---|
| 1,687,782 | 10/1928 | Norton | 405/43 X |
| 2,084,351 | 6/1937 | Luce | 405/43 X |
| 2,162,926 | 6/1939 | Wuelker | 405/46 |
| 3,060,693 | 10/1962 | Taylor | 405/43 |
| 3,440,823 | 4/1969 | Olsen | 405/43 |
| 4,134,268 | 1/1979 | Elmore | 405/43 |
| 4,404,516 | 9/1983 | Johnson, Jr. | 340/605 X |

Primary Examiner—James L. Rowland
Assistant Examiner—Daniel Myer
Attorney, Agent, or Firm—H. D. Messner; Edward J. Keeling

[57] ABSTRACT

The present invention relates to a water detection subassembly and method for forming same, for use in association with water detection system operating within a digital computing center. The subassembly includes a perforated protective semi-circular shield fitted about a fabric mesh supporting copper conductors connected to a low voltage source. The perforations of the shield are formed into two distinct patterns: The first series comprises sets of openings adjacent to the apex of the shield and periodically spaced therealong. Each opening has a common arcuate length L, a width W, and an internal spacing S and, more importantly, is of sufficient dimension to allow easy entry of aerosol mixtures of air and water droplets originating from above the shield. But each such opening (in combination with neighboring openings), does not weaken each shield unduly to the point the shield will collapse during usual housekeeping operations at the computer center, as when the computing equipment is repaired, replaced, or renovated. In a preferred embodiment, each opening has a common arcuate length L of about 1 inch, a width of about 1/16 to $\frac{1}{8}$ inch, and a spacing S of between 2 to 3 inches for a semicircular shield having a 1$\frac{1}{2}$ inch radius. The second series of openings comprises sets of openings formed along terminating, longitudinal edges of the shield to allow easy entry of water at sub-floor level interior thereof.

6 Claims, 4 Drawing Figures

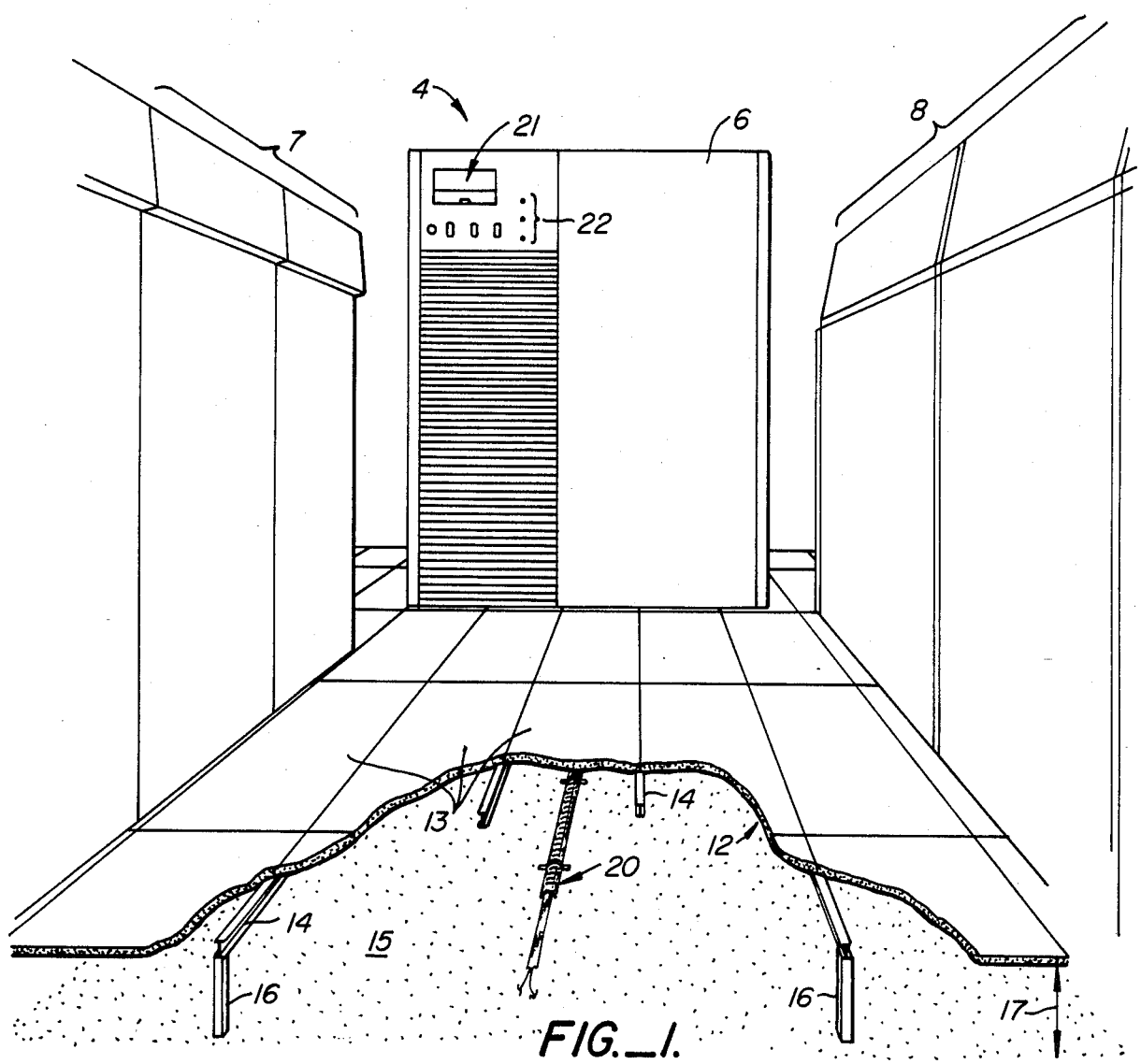
FIG._1.
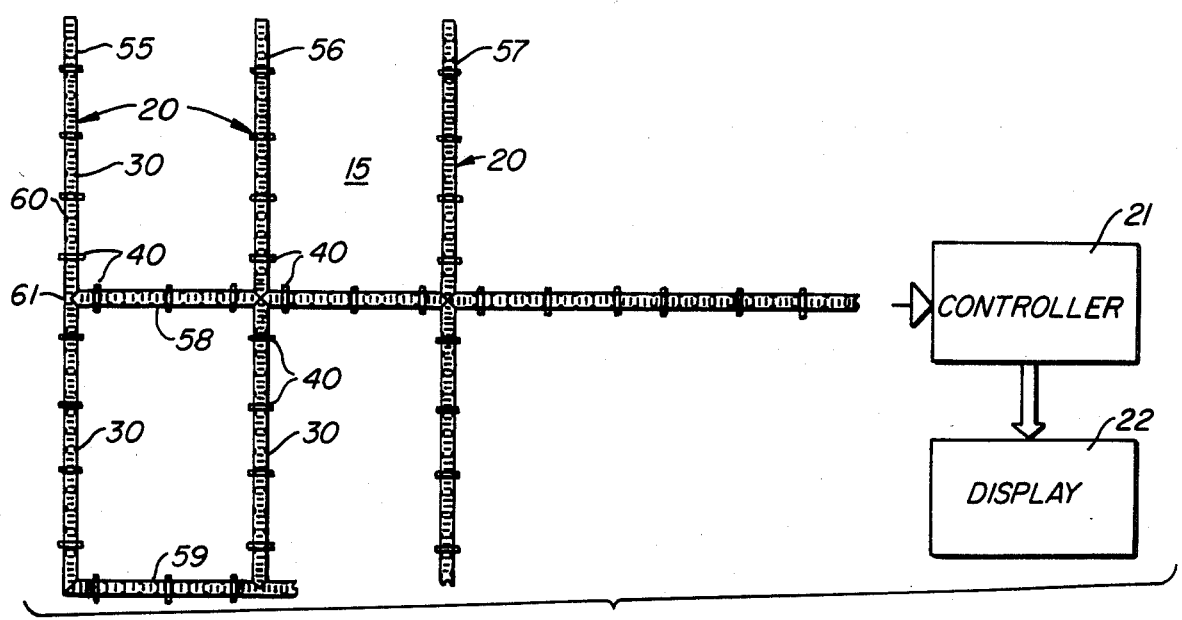
FIG._4.

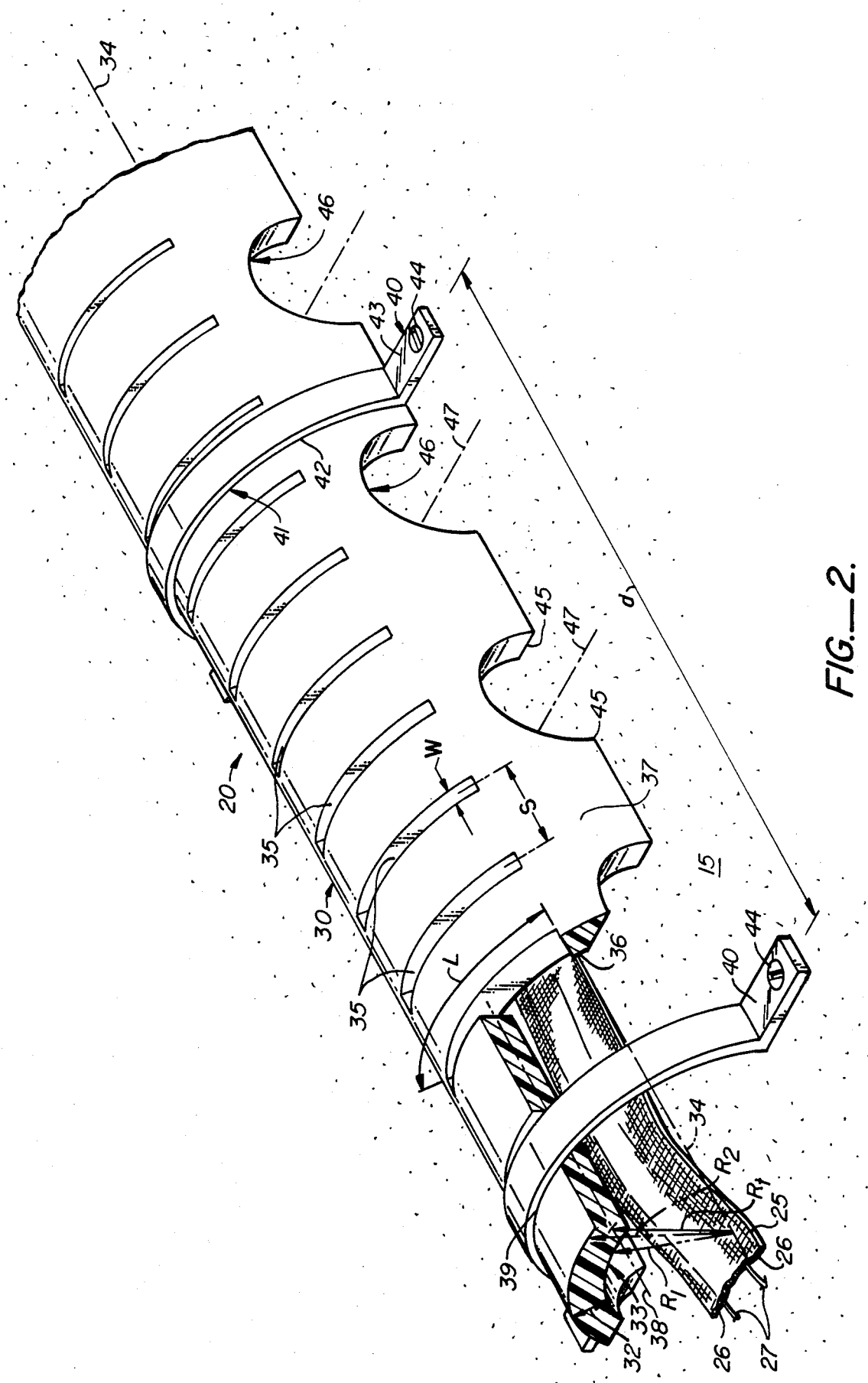
FIG._2.

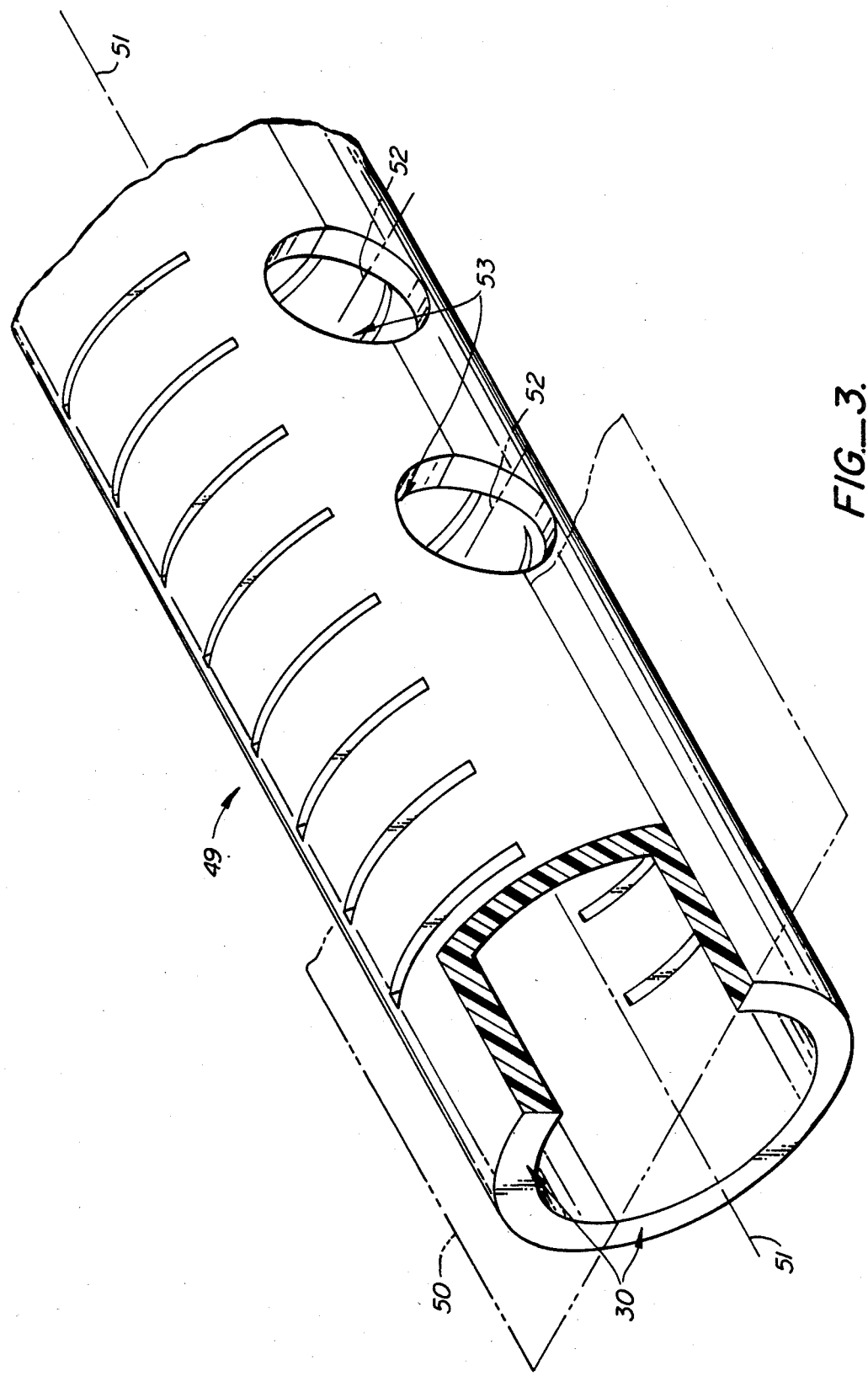

WATER DETECTION SUBASSEMBLIES AND METHOD OF FORMING SAME, FOR USE IN COMPUTER PROCESSING CENTERS

RELATED APPLICATION

In my copending application, Ser. No. 432,846, filed Oct. 4, 1982, for "WATER DETECTION SUBASSEMBLY AND METHOD OF FORMING SAME, FOR USE IN ASSOCIATION WITH WATER DETECTION SYSTEMS IN COMPUTER PROCESSING CENTERS", now U.S. Pat. No. 4,538,141, issued Aug. 27, 1985, there is described and claimed a plastic shield for attachment atop the fabric mesh of the water detection system to prevent abuse of the latter. The shield is formed from a conventional section of plastic pipe, horizontally sectioned as to form pairs of semi-circular shields and attaches to the sub-floor by headless studs extending through the apex of the shield into the sub-floor at spaced locations therealong. Wing nuts attach to the studs. Semi-circular openings at the contacting edge of the shield with the sub-floor, permit passage of the water into contact with the fabric (and sensing conductors of the water detection system).

Experience has now shown in connection with the use of the above-described embodiment, that improvements can be made to speed its installation within a computer center and to improve its ability to detect air-borne particles of water (aerosol mixtures of air and water) emerging from locations above the shields in a fine mist, as when water-carrying hoses develop tiny cracks in their side walls.

But it is also evident that any proposed improvements to my previously claimed and described embodiment must be compatible in purpose and result, viz., one to the other, or detract to the primary goal related to the provision of (and/or maintaining) reliability of the water detection system as a whole.

SCOPE OF THE INVENTION

This invention relates to water detection systems used in connection with digital computer processing centers and more particularly to a subassembly and method of forming same, for extending the life of such systems even though the associated computing equipment is subject to frequent renovation, repair and replacement.

BACKGROUND OF THE INVENTION

In designing today's modern computing centers for digital computer and their associated equipment, i.e., I/O's, printers, modems, etc., architects provide a rather standard approach to construction: a sub-floor say of concrete is first poured and then a raised support floor is built above the sub-floor. The latter usually consists of a series of horizontal panels removably resting on a web of rails supported, in turn, by a set of headers. A vertical workspace is provided between the panels and the sub-floor in order to stow electrical wiring harnesses and the like, to permit easy internal connection of the computer and associated peripheral equipment as well as external connection of the latter to outside tieing equipment.

Since such centers represent a large capital investment, a detection system is typically provided to warn operators if water enters the sub-floor beneath the computing equipment. The system usually includes a detector subassembly consisting of a fabric mesh of electrically inert material supporting a pair of electrical conductors.

The subassembly is placed atop the concrete sub-floor in a predetermined deployment pattern. Electrically, the conductors connect to a display panel through a controller.

If water comes into contact with the fabric mesh, an electrical circuit that includes the conductors, the water bridge and an energy source (at the controller), is closed. At the display panel, a visual and/or audio alarm in the same circuit become energized, alerting the operator to the presence of water (at the floor level below the computing equipment).

But experience has now shown that during frequent renovation, repair or replacement of the computer and/or associated equipment, workmen laboring in the work space, can abuse the fabric mesh atop the sub-floor, resulting in unreliable operations of the water detection system.

That is to say, the activity of the workmen, e.g., can roughen the fabric mesh allowing the latter to loosen its fit about the conductors. Since the relative distance between conductors is thus altered (sometimes drastically!), the amount of water that activates the system is likewise changed but in a non-linear manner. The resulting unreliability inherent in such circumstances, can be very disruptive to normal operations, especially in the environment of a busy computing center in which various computing and associated activities are occurring simultaneously.

SUMMARY OF THE INVENTION

In accordance with the present invention, attachment of the resulting semi-circular shields to the sub-floor (say along the broad cut longitudinal surfaces of the side wall) is enhanced by using downwardly directed restraining forces periodically along each shield. Source of the restraining forces: A series of modified C-shaped hangers that frictionally grips the shields along arcuate segments but which can be easily attached to the sub-floor by bolts or nails passing through planar bases. The planar base of each hanger is provided by folding a terminal segment of the hanger back upon itself. In this regard, the centers of formation (of each retaining arcuate segment and the shield being retained) are coincident and define equal radii. As a result, the partial circumference distance measured around the shields in the vicinity where surface-to-surface contact with each hanger occurs (along the arcuate segment), must be equal in length to that of the arcuate segment. It is also preferred that the apex of the shield (measured from and with respect to the sub-floor) be bounded by and fall within the arcuate segment of each hanger to prevent the shield from lateral movement parallel to the sub-floor.

Installation (and replacement) is facilitated by using a concrete drive gun to insert nails or bolts into the sub-floor through openings in the base of each hanger.

The number of entryways within each shield for water sampling has been increased.

In addition to the series of semi-circular openings along the shield at its intersection with the sub-floor (to allow entry of water at sub-floor level), an additional series of arcuate trenches are provided at the apex of each shield to allow entry of fine mists of water originating from above the shield. Since the setting rate of the aerosol mixture through the trenches is a function of the convection rate within the crawl space, the particles diameter of the water and the size of the openings, (and the former two conditions can vary with use), the trench size should be chosen for maximum entry efficiency without unduling weakening the strength of each shield. A width of about 1/16-⅛ inch and internal spacing of about 2 to 3 inches have been found to be adequate in this regard.

BRIEF DESCRIPTION OF THE DRAWINGS

FIG. 1 is a perspective view of a modern computer center in which a raised floor is partially cut-away so as to better illustrate a water detection subassembly including protective shields enclosing a fabric mesh-copper conductor combination, positioned atop a concrete sub-floor;

FIG. 2 is a perspective view of the protective shield of FIG. 1;

FIG. 3 is another perspective view of a section of plastic pipe constructing shields of FIGS. 1 and 2; and FIG. 4 is a pictorial representation of a particular detection arrangement of the detection subassembly of FIG. 1 in accordance with the present invention as well as showns electrical connection of the conductors of that subassembly to a display panel through a controller.

DETAILED DESCRIPTION OF THE INVENTION

A modern computing center 4 is shown in FIG. 1. The center 4 includes usual computing equipment, say a computer main-frame 6, and peripherals such as I/O's etc. The computing equipment is positioned in a computing room that includes side walls 7, 8 and a raised floor 12 formed of a series of horizontally disposed panels 13. The panels 13 removably rest on a web of support rails 14. The rails 14 in turn are supported above a concrete sub-floor 15 by a series of headers 16. Between the raised floor 12 and the sub-floor 15 is a work space 17. The space 17 provides a storage area for electrical wiring harnesses (not shown) associated with computing equipment.

At the intersection of work space 17 and sub-floor 15 is water detection subassembly 20 of the present invention. While mechanically, the subassembly 20 is positioned atop sub-floor 15, electrically it connects topside to controller 21 and display panel 22. Operation of the controller 21 and display 22 in conjunction with detection of water a sub-floor, will be described in detail below.

FIG. 2 illustrates water detection subassembly 20 in more detail.

Water detection subassembly 20 includes a fabric mesh 25 of roughly rectangular cross section. The mesh 25 is electrically non-conductive and is preferably formed of an open weaved, liquid permeable construction such as provided by impregnating loose strands of nylon with glass fibers. The nylon/glass fiber combination is then formed so as to include side-by-side channels 26. These channels 26 snugly support a pair of copper conductors 27.

The mesh 25 and copper conductors 27 are not subject to abuse from above, however, because surrounding that combination is a series of protective shields 30. Their purpose: to keep the mesh 25 from tearing and hence preventing loosening of the mesh support from the copper conductors 27.

That is to say, the present invention provides a curved protective dome 33 strong enough to keep outside forces (viz., those generated by workmen's shoes) from being applied directly to the mesh 25 and/or conductors 27. The dome 33 is semicircular in cross section and is seen in FIG. 2 to have inner and outer surfaces 36 and 37, respectively, defined by radii R1 and R2, which in turn define wall thickness 32. Both radii originate from central axis of formation 34 of the dome 33.

Note also that dome 33 is also provided with a series of arcuate trenches (or rectangular openings) 35 transverse to the axis of formation 34 periodically spaced along the full length of the shield 30. Purpose: to allow entry of air-borne water particles (aerosol mixtures of water and air) interior of the shield into contact with the mesh 25.

Each trench 35 is concave with respect to the formation axis 34 and has an arcuate length (L) equal to about ⅓ of the available circumferential distance of each shield 30, i.e., $$L = \pi r / 3$$

where L is the maximum length of the trench 35; and r is the radius R2 of the outer surface 37 of the dome 33.

Each rectangular trench 35 has a central axis of entry 38 centered at apex 39 of the dome 33 but transverse to axis of formation 34. Each trench 38 is radially spaced from axis 34 by a radius $Rt = R1 + R2/2$ where radii R1 and R2 are associated with interior and outer surfaces 36 and 37 of the dome 33, respectively.

The depth of each trench 35 is likewise defined by the shape of dome 33, and thus is a function of the differences between the radii 36 and 37 of the dome 33, in the manner previously described. Since the shields 30 are formed of conventional plastic pipe (to be described in greater detail hereinafter), little can be done to vary the depth of the trenches 35 from a practical viewpoint, i.e., for example to increase the settling rate of any aerosol mixture of water and air passing therethrough by decreasing the depth of the trenches 35.

In this regard, it has been determined that assuming the settling rate of such aerosol mixtures to be a function of the convection rate within the crawl space between the raised floor (not shown) and the sub-floor 15, the particle diameter of the water droplets, and the two-dimensional area of the entryways, then the two-dimensional area of each trench 35 should be chosen for maximum entry efficiency without unduly weakening the shield 30. A width of about 1/16 to ⅛ inch and length of about one (1) inch per trench plus a spacing interval of about two (2) to three (3) inches (between adjacent trenches), have been found to be adequate in this regard.

Attachment of the shields 30 to the sub-floor 15 is provided by a series of C-shaped hangers 40. The C-shaped hangers 40 are placed at spaced locations along the shield and have a portion which is co-extensive of the series of trenches 35. Distance d between adjacent hangers 40 varies with the amount of abuse that could be encountered within the particular computing center. But in usual circumstances, experience has shown that using a distance d equal to about four (4) feet is usually adequate.

Each hanger 40 includes an arcuate segment 41 having an inner surface 42 which contacts the outer surface 37 of the shield, and a base member 43 that parallels the sub-floor 15 for attachment thereto. The base member 42 is formed by folding the lower terminus of the full C-member back upon its self; when attachment occurs, the lower surface of base member 42 is brought into surface contact with the sub-floor 15, as the arcuate segment 41 is placed in snug contact with the outer surface 37 of the shield 30.

In this regard, the inner surface 42 of arcuate segment 41 of each hanger 40 and the outer surface 37 of each shield 30 have matching radii of formation viz., equal to the radius vector R2 of FIG. 2. Also the circumferential area of contact of such segment 41 is such that it fully envelopes the apex 39 of the dome 33. Hence, the shield is denied lateral movement parallel to the sub-floor 15, even if kicked by the foot of a workman.

Installation and replacement of the hangers 40 is facilitated by using a concrete stud gun to insert bolts 44 with enlarged heads through the base member 43 into the concrete sub-floor 15. When the bolts 44 are driven through the base member 43, the arcuate segment 41 of each hanger 40 is brought into snug surface contact with the upper surface 37 of each shield.

In the way, the shield 30 can be quickly attached to the sub-floor 15 in one operation.

At the intersection of the sub-floor and the side wall 34, i.e., at the intersection of first and second surfaces 45 and the sub-floor 15, note the presence of twin series of semi-circular openings 46. Each opening has a central axis of formation 47 transverse to central axis 34. Thus, from the side, the ports provide a scalloped look to the shield 30. The purpose of openings 46: to permit water at the sub-floor level an easy route into the interior of the shield for detection.

FIG. 3 illustrates constructional details of the shield 30 of FIG. 2.

As indicated, a pair of shields 30 can be conveniently formed from a section of plastic pipe 49, such as commercially available 2½ inch O.D. PVC pipe sliced longitudinally along a horizontal cutting plane 50. Note plane 50 intersects both (i) axis of symmetry 51 of pipe 50 as well as (ii) axes of symmetry 52 of a series of evenly spaced openings 53. Note further that these axes of symmetry 51, 52 are not colinear but instead are orthogonal to each other. In that way, as the pipe 49 is horizontally cut along the cutting plane 50, the pre-drilled openings 53 are likewise bisected, viz., cut into equal diametrical segments, to provide the scalloped look previously mentioned.

Since pre-drilling of the openings 52 precedes the horizontal cutting step described above, production of the shields 30 is simplified and costs reduced. That is to say, since a pair of shields is formed from each section of pipe 49, the resulting shields 30 are relatively inexpensive to manufacture. Thereafter, each pair of shields undergo further processing, related to providing arcuate, rectangular trenches 35. In this regard, the shields can be positioned on working table of a fixed plane rotary saw (not shown) and then cross-cut to provide the trenches. This, of course, means that the distance above the work table to the point of intersection of the saw blade with the shield is such as to provide the required arcuate length of each trench 35 within the proscriptions previously mentioned. The width of the blade of the saw controls the width of each trench 35 in a similar manner. By then, laterally shifting the shield relative to the saw, the process is repeated until all trenches are provided for along the entire length of each shield. Thereafter, each finished shield can be cut into appropriate lengths depending on the particular detection pattern chosen for the water detection subassembly of the present invention.

FIG. 4 illustrates a particular detection pattern for positioning subassemblies 20 atop the sub-floor 15, viz., as a two-dimensional array.

As shown, a series of subassemblies 20 form a $N \times N$ array across the sub-floor 15. Columns of the subassemblies are indicated 55, 56 and 57 while rows of the subassemblies are indicated at 58 and 59. As previously mentioned, each subassembly 20 includes fabric mesh 25 woven so as to support copper conductors 27. Protecting the mesh 25 and conductors 27 is via the plurality of shields 30 previously described with specific reference to FIGS. 2 and 3, supra.

Exact indication as to location of any detected water within the above $N \times N$ array, is provided by monitoring the particular columns or row of subassemblies 20 activated by the water detector system during monitoring operations. For example, if water is first detect at location 60 along column 55, the operator knows its ordinate coordinate. As soon as leak spreads to location 61, he also can pinpoint its abscissa coordinate.

In operation, a small voltage is impressed across the conductors 27 by means of a power source within controller 21 (not shown). If water comes into contact with the fabric mesh 25 (and conductors 27), an electric circuit that includes the water bridge and the energy source, is closed. At the display panel 22 visual and/or audio alarms in the same circuit, become energized alerting the operator to the presence and geographical location of the water (at the sub-floor 15 below the computing equipment). I.e., activation of the indicator(s) at the display panel 22 can be coordinated with sub-assembly position atop the sub-floor 15 on a one-to-one basis, so as to further aid the operator to pinpoint the exact location of the water invasion.

While various controller and display circuits are available for providing the alarm and display functions indicative of water invasion, one particular system familiar to those skilled in the art is set forth in U.S. Pat. No. 3,882,476 for "ALARM SYSTEM PERIODIC TEST SECTION" in which a terminal resistor is used to impress a voltage across a segment of conductor/mesh electrically connected to a trigger circuit.

When water invades the mesh 25, the transition resistance of the combination (shunting the pair of conductors) is considerably reduced and the trigger circuit is activated to enable an alarm circuit for operator intervention.

The invention is not limited to the above combinations alone, but is applicable to other anomalous circumstances as known to those skilled in the art. It should thus be understood that the invention is not limited to any specific embodiments set forth herein, as variations are readily apparent.

For example, instead of using a $N \times N$ array detection pattern for positioning the subassemblies 20 of the present invention atop the sub-floor 15, other patterns are also contemplated, e.g., a "sunburst" pattern.

Thus, the invention is to be given the broadest possible interpretation within the terms of the following claims.

What is claimed is:

1. Method of forming a series of water detection subassemblies in association with a water detection system for use in a digital computing center, said center including a computing room having a raised floor above a non-trafficked sub-floor but said raise floor also supporting computer equipment and the like, comprising:
(i) forming a plurality of perforated plastic shields each of substantially semi-circular cross-section, wherein the perforations of each shield are formed into first and second series of openings therealong, said first series comprising sets of arcuate openings coincident with the apex of the shield and periodically spaced therealong, each opening having a common arcuate length L, a width W and internal spacing S and being of sufficient dimension to allow easy entry of aerosol mixtures of air and water droplets originating from above said each shield but in combination with neighboring openings, not to unduly weaken said each shield and allow collapse thereof during repair, replacement or renovation of said computing equipment, and the second series of openings comprising sets of openings along terminating longitudinal edges of the shield to allow easy entry of water at sub-floor level interior thereof;
(ii) positioning a fabric mesh formed of an electrically non-conducting material and physically supporting a pair of conductors, upon the sub-floor in a predetermined pattern;
(iii) attaching said shields to said sub-floor along the terminating longitudinal edges thereof about said fabric mesh;
(iv) electrically connecting said pair of conductors supported by the fabric mesh to a voltage source means of said detection system whereby water gaining entry through either first or said second series of openings and contacting said conductors adjacent said sub-floor establishes a low-resistance bridge shunting said pair of conductors and permits current flow therethrough for use in warning operators of said water invasion, but wherein said mesh and conductors are completely protected against physical abuse as from contact with workmen's shoes and the like during repair, replacement or renovation of said computing equipment.

2. Method of claim 1 in which step (ii) includes:
(a) placing said shields atop the sub-floor;
(b) fitting a series of hangers having arcuate segments about the shields;
(c) shooting fasteners with enlarged heads through the hangers via openings through transverse base members thereof, into said sub-floor to secure the shields relative to the sub-floor in one operation.

3. Method of claim 1 in which step (i) includes:
(a) pre-drilling a section of conventional plastic pipe with a series of transverse openings, said openings have axes of symmetry coextensive with each other and intersecting the central axis of symmetry of the pipe at about 90 degrees; and
(b) slicing the plastic pipe longitudinally along a central plane to bisect both the pipe and said series of openings transverse to the central axis of symmetry, thereby forming at least a pair of shields per longitudinal cut and wherein each resulting shield has formed along the terminating longitudinal edges thereof;
(c) sawing the top of each shield and a transverse direction to form said first series of arcuate openings coincident with the apex of each shield periodically spaced therealong with said spacing of S, said sawing being controlled as to width W and depth as to provide said arcuate length L whereby each opening is sufficient to allow easy entry of said aerosol mixture of air and water droplets interior thereof when the shield is attached to the sub-floor but in combination with neighboring openings of spacing S does not unduly weaken said each shield and allow collapse thereof during physical abuse as from contact with workmen's shoes and the like during repair, replacement or renovation of said computing equipment.

4. Method of claim 3 in which said conventional plastic pipe is about $2\frac{1}{2}$ inches O.D.; said each shield has about a $1\frac{1}{4}$ inch radius; and said each opening of said first series of openings has an arcuate length L of about 1 inch, a width W of about 1/16 to $\frac{1}{8}$ inch and a spacing S from neighboring openings, of about 2 to 3 inches.

5. A water detection subassembly in association with a water detection system for use in a digital computing center, said center including a computer room having a raised floor above a non-trafficked sub-floor but said raised floor also supporting computing equipment and the like, comprising:
(a) a fabric mesh formed of electrically non-conducting material
(b) a pair of copper conductors physically supported by said mesh and electrically connected to a low voltage source;
(c) a perforated plastic shield having wall means of semi-circular cross section contacting said sub-floor along first and second diametrically opposed surfaces defined by a central longitudinal plane coextensive with said sub-floor and surrounding said mesh and conductors and completely isolating them against physical abuse during repair, replacement or renovation of said computing equipment at the center;
(d) said perforations of the shield being formed into first and second series of openings through said wall means, said first series comprising sets of arcuate openings coincident with the apex of each shield and periodically spaced therealong, each opening having a common arcuate length L, a width W and internal spacing S and being of sufficient dimension to allow easy entry of aerosol mixtures of air and water droplets originating from above said each shield but in combination with neighboring openings not to unduly weaken said each shield and allow collapse thereof during repair, replacement or renovation or said computing equipment and the second series of openings comprising sets of openings along terminating, longitudinal edges of the shield to allow easy entry of water at sub-floor level interior thereof.

6. Subassembly of claim 5 in which each of said arcuate openings comprising said first series of perforations of said wall means is rectangular in cross-section has an arcuate length L of between 1 and 3 inches, a spacing S between 2 and 3 inches and a width W between 1/16 to $\frac{1}{8}$ inch, and defines a central axis of entry transverse to said central longitudinal plane whereby said aerosol mixtures of water and air can gain easy entry interior of said shield during operations.

* * * * *